J. D. ELLIS.
WEED EXTRACTOR.
APPLICATION FILED JAN. 6, 1913.
1,061,361.
Patented May 13, 1913.
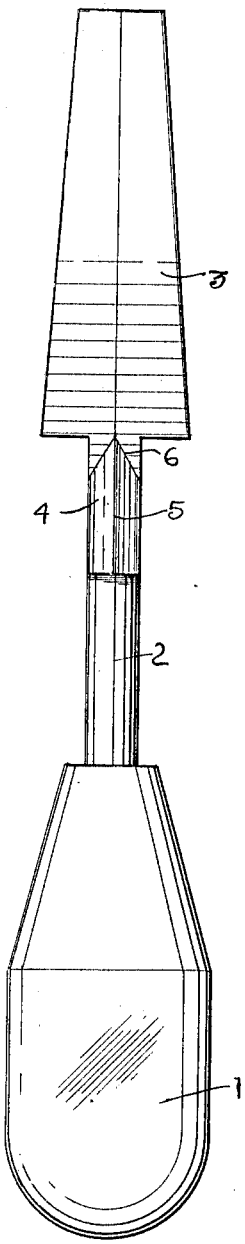
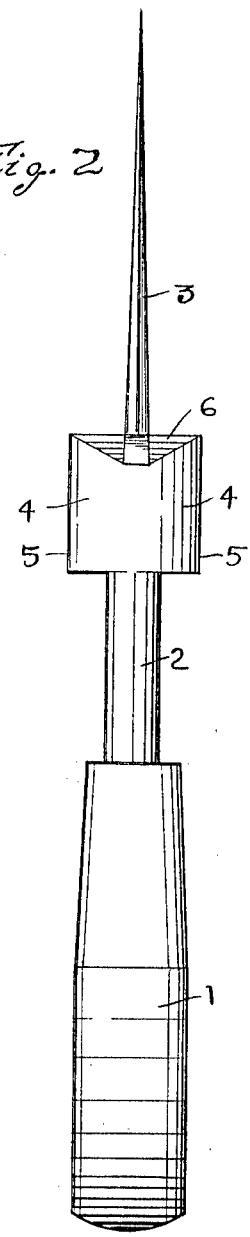
Witnesses
Inventor
J.D. Ellis
By Watson E. Coleman,
Attorney

UNITED STATES PATENT OFFICE.

JACOB D. ELLIS, OF CASTLE ROCK, COLORADO.

WEED-EXTRACTOR.

1,061,361.  Specification of Letters Patent.  Patented May 13, 1913.

Application filed January 6, 1913. Serial No. 740,562.

*To all whom it may concern:*

Be it known that I, JACOB D. ELLIS, a citizen of the United States, residing at Castle Rock, in the county of Douglas and State of Colorado, have invented certain new and useful Improvements in Weed-Extractors, of which the following is a specification, reference being had to the accompanying drawings.

This invention relates to improvements in devices for extracting or removing weeds from lawns, and an object thereof is the provision of a device of this character which is adapted to cut the root of the weed so as to more easily extract the same from the ground.

A further object of this invention is the provision of a weed puller which consists of a handle, shank, and knife blade, the shank being provided adjacent the blade with laterally extending lugs or wings which serve to remove the root of the weed from the ground.

With these and other objects in view, my invention consists in certain constructions and arrangements of parts, to be hereinafter more fully described, claimed and illustrated in the accompanying drawing, in which—

Figure 1 is a side elevation of my device; and Fig. 2 is an edge elevation thereof.

Referring more particularly to the drawing, the device comprises a handle 1, shank 2, and knife blade 3, the several parts being preferably formed of one piece of metal. The knife blade 3 is tapered to form a cutting edge at its extremity, and the opposite faces of the blade 3 are beveled to form cutting edges. Formed integral with the shank adjacent the inner end of the blade 3 are laterally extending lugs 4, the lugs being beveled on their opposite faces as at 5 to form cutting edges, and being also beveled at the forward edges as at 6 so that the lugs may be easily inserted into the ground.

In the use of my device, the knife blade 3 and lugs 4 are forced into the ground adjacent the stem of the weed, the lugs forming a fulcrum for the knife, so that when the handle is moved from side to side, the knife blade 3 will cut the root.

When the knife blade 3 is inserted into the ground, one of the lugs 4 should extend beyond the side of the weed, and it will be apparent that a slight rotation of the handle 1 not only severs the root of the weed, but the lugs 4, which have been previously inserted into the ground, break the earth around the weed and permit its ready removal.

What I claim is:—

A device of the character described, comprising a handle, a shank secured thereto, a knife blade formed upon the shank, said blade tapering toward the free end thereof and producing a terminal cutting edge and side cutting edges, lugs formed upon the shank at its juncture with the blade, said lugs being tapered at their opposite sides to produce side cutting edges and at their ends to produce an end cutting edge, as and for the purpose set forth.

In testimony whereof I hereunto affix my signature in the presence of two witnesses.

JACOB D. ELLIS.

Witnesses:
F. A. CARTER,
L. L. HUNTER.

Copies of this patent may be obtained for five cents each, by addressing the "Commissioner of Patents, Washington, D. C."